Dec. 23, 1969  R. L. BEHRENS  3,485,047
HYDRAULIC MOTOR HAVING SPEED AND DIRECTIONAL CONTROL SYSTEM
Filed April 25, 1967  6 Sheets-Sheet 2

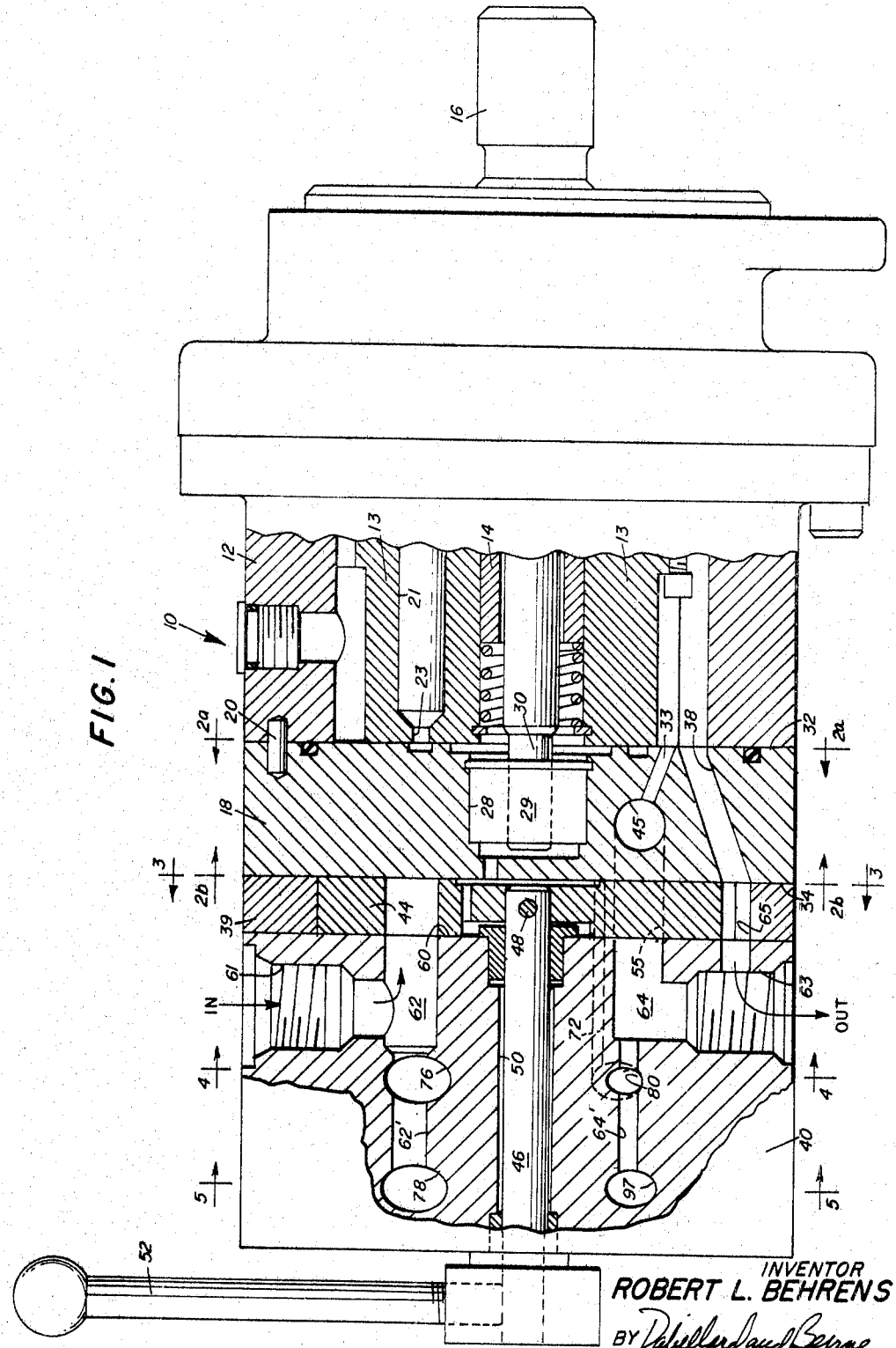

INVENTOR
ROBERT L. BEHRENS
BY
ATTORNEYS

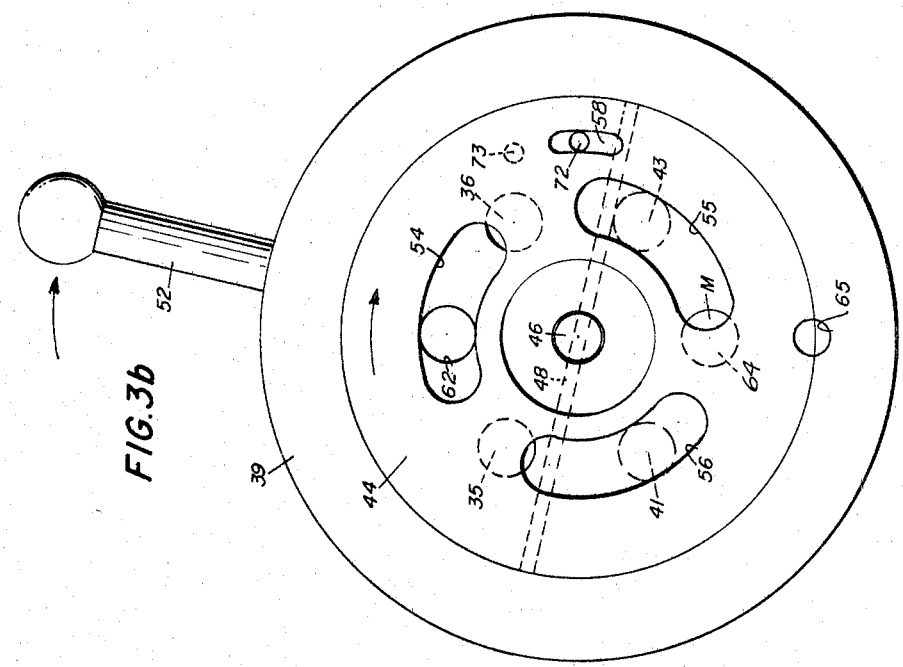
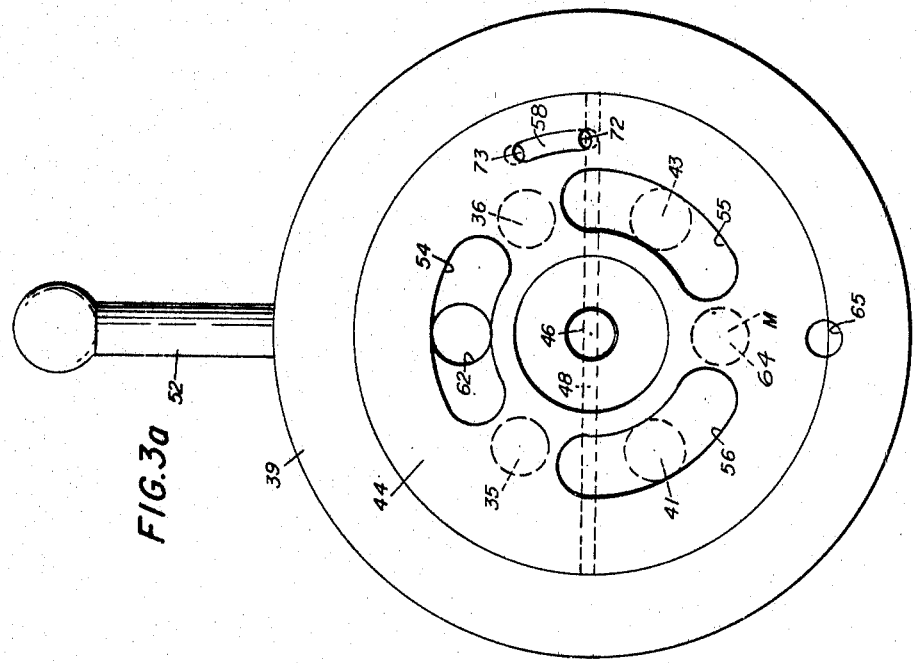

Dec. 23, 1969    R. L. BEHRENS    3,485,047
HYDRAULIC MOTOR HAVING SPEED AND DIRECTIONAL CONTROL SYSTEM
Filed April 25, 1967    6 Sheets-Sheet 5

INVENTOR
ROBERT L. BEHRENS
BY
ATTORNEYS

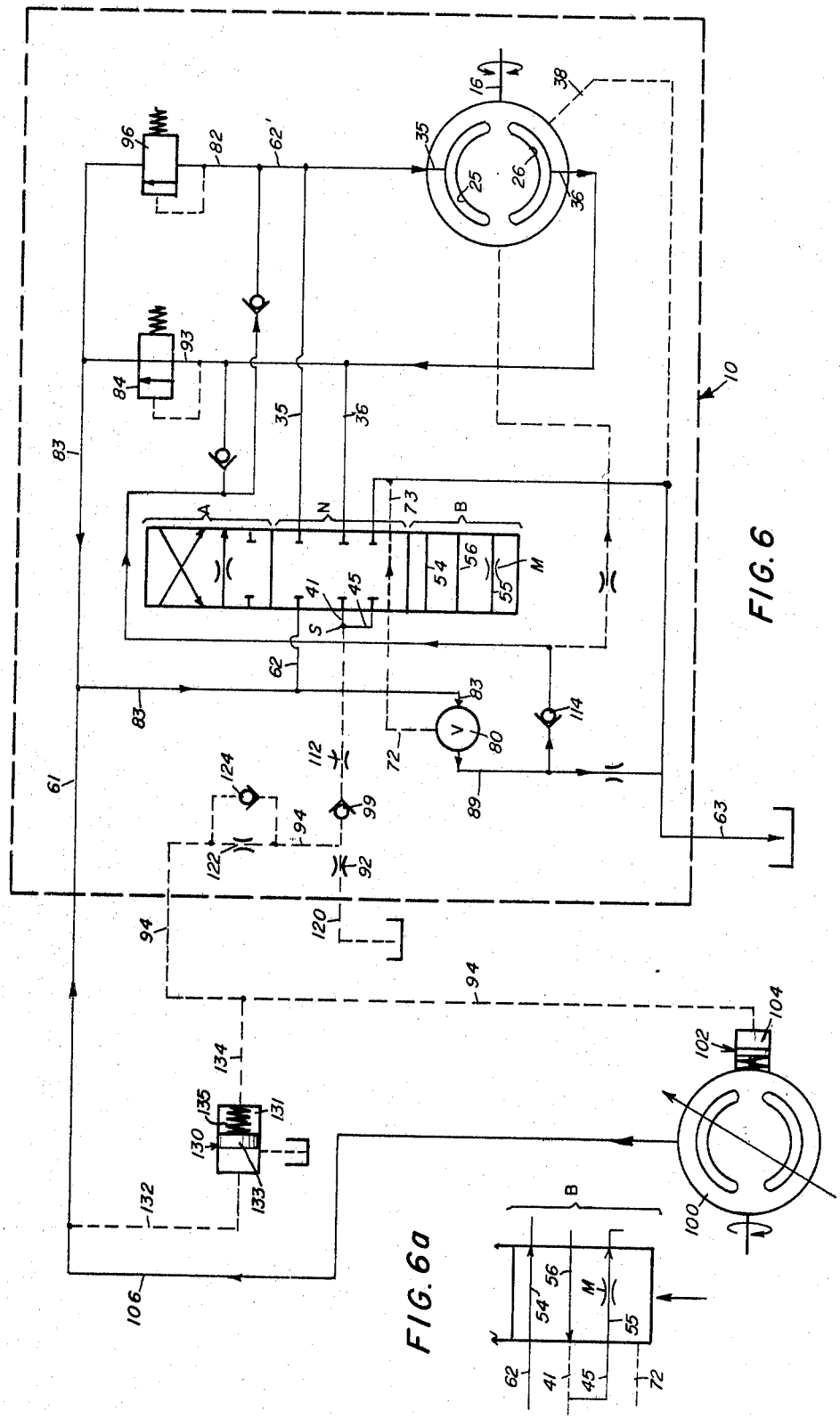

United States Patent Office 3,485,047
Patented Dec. 23, 1969

3,485,047
HYDRAULIC MOTOR HAVING SPEED AND
DIRECTIONAL CONTROL SYSTEM
Robert L. Behrens, Waukesha, Wis., assignor to Applied
Power Industries, Inc., Milwaukee, Wis., a corporation
of Wisconsin
Filed Apr. 25, 1967, Ser. No. 633,502
Int. Cl. F16h 39/02, 39/44
U.S. Cl. 60—53        6 Claims

ABSTRACT OF THE DISCLOSURE

A hydraulic motor of the axial piston type having a rotating porting disc disposed between a valve plate which is in engagement with a piston carrying barrel and an end block carrying a valving system which, in cooperation with the aforementioned disc and plate, detects system requirements for fluid and reflects these requirements to a variable fluid power source.

---

This invention relates generally to a hydraulic system and more particularly to a fluid motor for use in the system and said motor having directional and speed controls as a part thereof.

Several ingenious methods and constructions for varying the speed and direction of axial fluid motors are known to the prior art. The most common method perhaps is the use of a lever-controlled cam plate for adjusting the angle at which the axes of the individual pistons meet their cam plate. This has the effect of varying piston displacement from zero to a maximum in either direction. In other environments, where a tiltable swash plate is not available, separate valving has been utilized for respectively controlling speed and direction. In systems of the latter type, separate operating handles are required for the separate functions and the valving itself forms no part of the motor housing. In the instant invention, a fluid motor is set forth wherein the characteristic ruggedness and durability of a fixed swash plate motor is maintained while the advantages of having a single lever speed and direction control commonly associated only with tiltable cam plate motors, is obtained. Therefore, one principal objective of this invention is to provide a hydraulic motor of rugged design wherein speed and directional changes can be made through the action of a single operator control handle.

Another important objective of this invention is to provide a hydrostatic transmission system having a variable volume pump for supplying the fluid requirements, a hydraulic motor having a single operator lever for setting the direction and speed at which the load is to be driven and means varying pump output in accordance with the fluid demands necessary for maintaining the speed selected by the operator lever.

A still further objective of this invention is to provide an anticipator means within the system for evening changes in the variable controls of the pump by lessening the effect of instantaneous pressure variations which do not accurately reflect the system's fluid requirements.

These principal objectives and other secondary objectives and advantages of the invention will be better understood upon a reading of the following specification taken in view of the drawings in which:

FIGURE 1 is a partial longitudinal cross-section of the fluid motor of this invention;

FIGURE 3a is a sectional view along the line 3—3 of FIGURE 1;

FIGURE 3b is also a sectional view along the line 3—3 of FIGURE 1 with several of the motor components displaced from their positions in FIGURE 3a;

FIGURE 6 is a schematic view of a novel hydraulic system in which the structure disclosed in FIGURES 1–5 is utilized; and FIGURE 6a is a partial schematic of a portion of FIGURE 6.

Figure 2A:
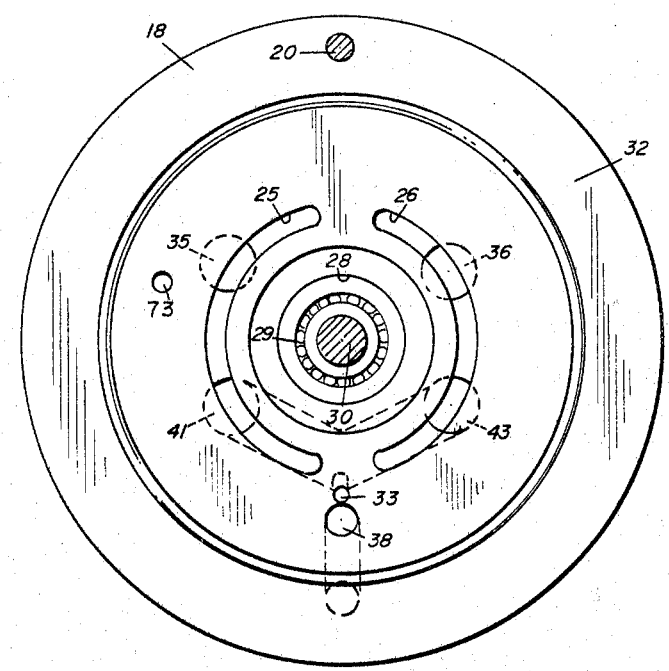
FIGURE 2a is a sectional view along the line 2a—2a of FIGURE 1.

Referring now to the drawings, wherein like elements are referred to by like numerals, the numeral 10 indicates the motor of this invention. The motor includes, a housing 12, a piston carrying rotatable barrel 13 and a torque sleeve 14 drivingly connecting the barrel 13 to the output shaft 16. The operation of the components within the housing 12 can be more completely understood with a reference to the U.S. patent to Stewart, No. 3,139,038 entitled "Engine," issued June 30, 1964.

In place of the cover 4 taught by the Stewart patent, a valve plate 18 is fixedly secured to housing 12 by way of dowels 20. The plate 18 is formed with arcuate intake and exhausts slots 25 and 26 (FIGURE 2a) which are radially disposed at a distance to communicate with the ports 23 formed at the ends of each of the piston chambers 21. The plate 18 is centrally bored at 28 which bore receives a roller bearing 29 by which the inner end 30 of driven shaft 16 is rotatably secured. The slots 25 and 26 are formed in the surface 32 of the plate and taper inwardly to circular ports 35 and 36 which open to the opposite surface 34 of the plate. A drainage passageway 38 communicating the interior of housing 12 to tank is provided. The drainage passageway permits the always present leakage in a motor of this type to bleed to the fluid reservoir. For all practical purposes the fluid pressures within housing 12 are tank or reservoir pressures.

The control end of the motor is further enclosed by an annular spacer ring 39 and an end block 40. The plate 18, the end block 40 and spacer 39 are secured to the housing 12 by way of a plurality of elongated bolts extending through each and threaded into housing 12. For purposes of clarity, the necessary seals, the bolts and their threaded receiving apertures are eliminated from all views.

Figure 2B:
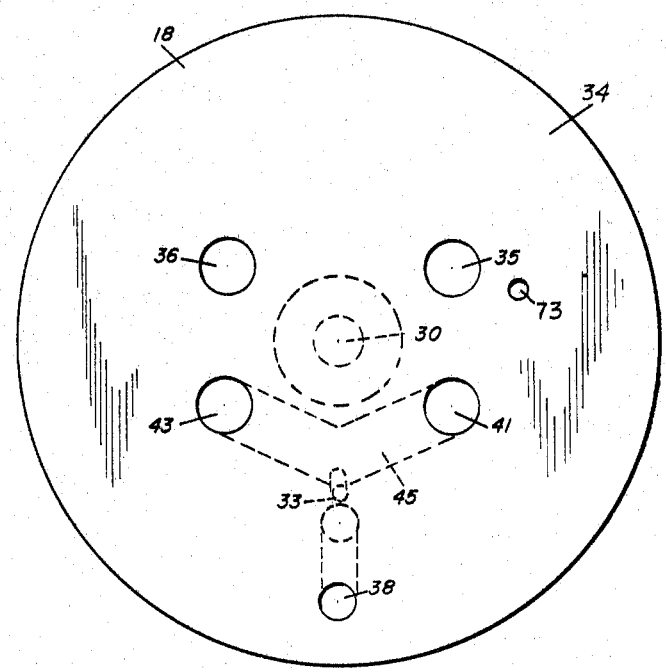
FIGURE 2b is a cross sectional view along the line 2b—2b of FIGURE 1.

As best seen in FIGURE 2b, the surface 34 of plate 18 is formed with a pair of shallow bores 41 and 43 which are communicated with one another by an interior passageway or chamber 45. Bores 41 and 43 do not extend through to surface 32 of the plate 18. Bores 41 and 43 fall in the same cylindrical plane as ports 35 and 36. The chamber formed by bores 41 and 43 and 45 are communicated to the barrel housing only by a relatively small dimension bleed passageway 33. Passageway 33 permits a small amount of cooling fluid to continue flowing through the system even when the barrel is not rotating or rotating slowly.

Located interiorally of spacer ring 39 between plate 18 and block 40 is a rotatable porting disc 44. A shaft 46 is affixed centrally of this porting disc at 48. The shaft is rotatably received in a center bore 50 of block 40 and an operating handle 52 is secured to the outer end thereof. It can be seen therefor, that the porting disc 44 is rotatably received between the plate 18 and block 40 and its radial position with respect to these members is controlled by a movement of handle 52.

The full lines of FIGURES 3a and 3b respectively portray porting disc 44 in a neutral and a half of midspeed position. The porting disc 44 has three equally spaced kidney slots 54, 55 and 56. These slots are in circumferential alignment with the bores 35, 36, 41 and 43 of plate 18. The porting disc 44 also is formed with a smaller kidney-shaped slot 58 for purposes hereinafter described. The porting disc controls the flow of fluid to and from the motor housing.

The inner face of end block 40 which engages the porting disc 44 is indicated by the numeral 60. The motor receives its fluid from a pressurized source through intake 61 of block 40 and exhausts fluid through the outlet 63. A bore 62 running longitudinally of block 40 intersects the fluid intake bore 61 and terminates in the face 60 in the same cylindrical plane as the bores 35 and 36. A second bore 64, parallel with bore 62, intersects the motor exhaust outlet 63 and also terminates in face 60, the above-mentioned cylindrical plane. Thus, bores 62 and 64 are also disposed in the same cylindrical plane as the slots, 54, 55 and 56 of pointing disc or plate 44. Therefore, it can be seen that, depending on the position of porting plate 44, the slots 54, 55 and 56 can communicate the intake and exhaust passages 62 and 64 with the portings of plate 18. A depression 65 in ring 39 aids in communicating the drainage passageway 38 to the exhaust port 63.

Figure 4:
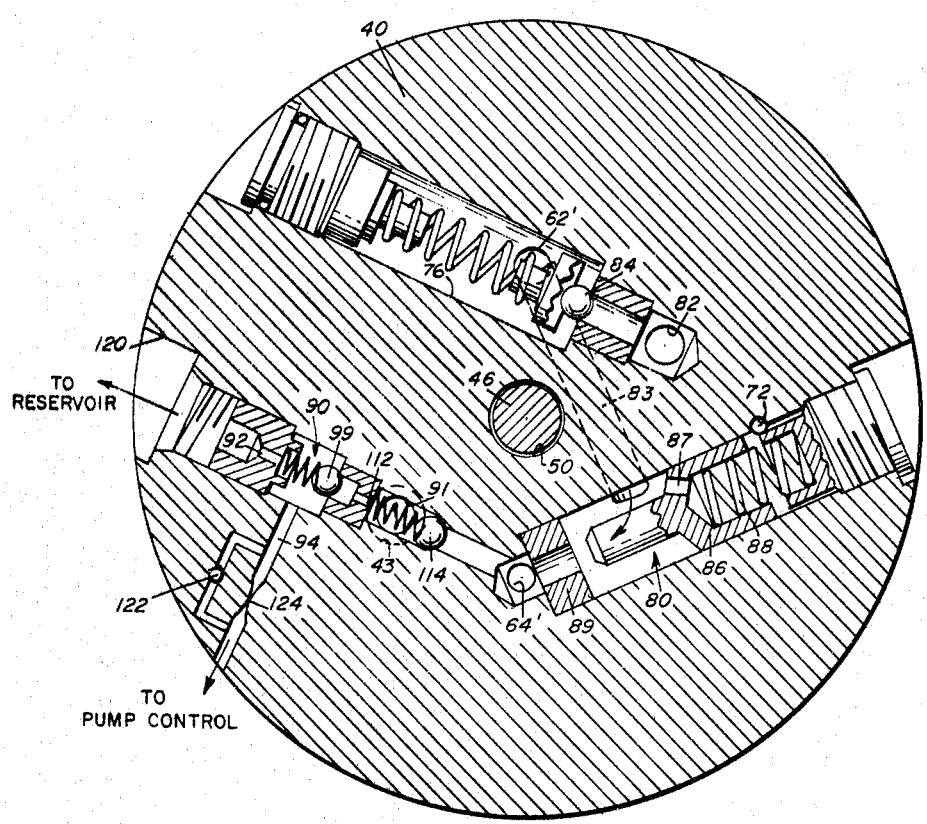
FIGURE 4 is a sectional view along the line 4—4 of FIGURE 1.
Figure 5:
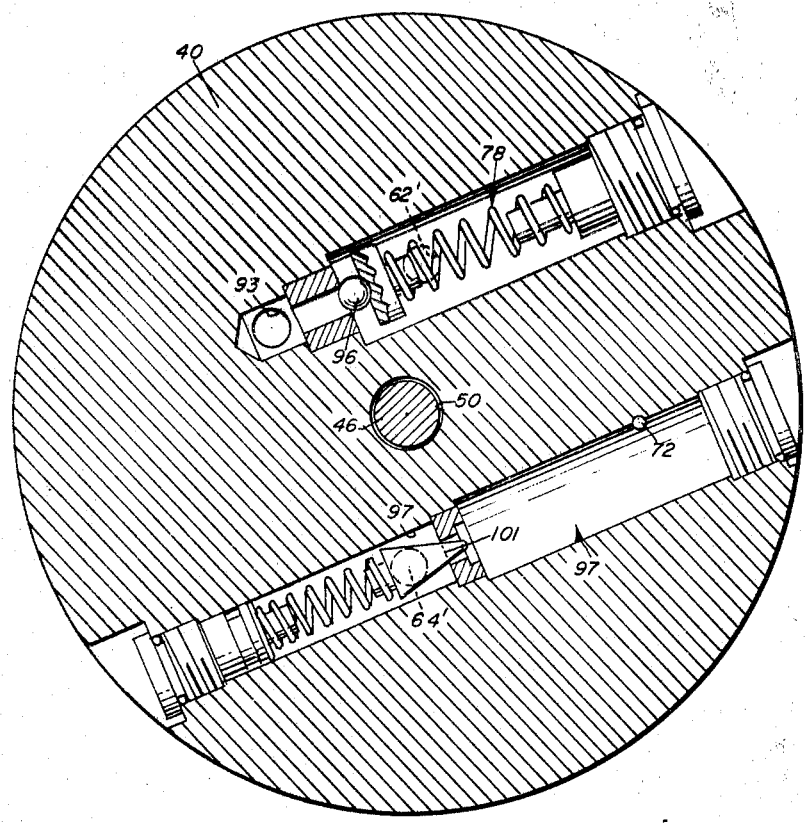
FIGURE 5 is the sectional view (partially diagrammatic) along the line 5—5 of FIGURE 1.

FIGURES 4 and 5 are a pair of cross sectional views through block 40 along the lines 4—4 and 5—5 of FIGURE 1. These sections are for purposes of disclosing certain interior valving in the block 40. In the interest of clarity, several of the production bores and their plugs for this valving are not shown.

As best seen in FIGURE 1, the pressure slot 62 is extended away from the barrel at 62' where intersection is made with passageways 76 and 78. The exhaust or tank passageway 64 is extended rearwardly at 64' where intersection is had with passageways 80 and 97. A third passageway 90 (FIGURE 4) not traversed in the longitudinal plane of FIGURE 1 is also formed in the block 40 in the same cross sectional plane as passageways 76 and 80 and is seen in FIGURE 4. The passageway 64' also intersects this passageway.

Still referring to FIGURE 4, it is seen that a passageway 76 extends between the passageway extension 62' and a passageway 82. Passageway 82 is coaxially aligned with intake port 36 of plate 18. A spring-biased relief valve 84 is located intermediate the length of passageway 76 between passageway 82 and extension 62'. A second passageway 80 is formed in block 40 and a bore 83 communicates passageway 76 with the passageway 80 intermediate its length.

A bore 72 intersects one end of passageway 80 and the other end thereof is intersected by the passageway extension 64'. A spring-biased check valve 86 is disposed between the tank pressure extension 64' and the bore 72. A third bore 90 intersects the bore 80 adjacent the passageway extension 64'. Intersecting the bore 90 intermediate its length is a passageway 91 leading to the S-pressure at port 41. The outer end of bore 90 leads to tank through restricting orifices 92 and 112 and check valve 99. Another bore 94 intersects the passageway 90 and leads to a pump stroke control lever for purposes which will be understood when the description of the schematic of FIGURE 6 is described. A check valve 114 is disposed intermediate the length of bore 90 between the bore 91 and the passageway extension 64'. A check valve 122 and a restriction 124 are disposed along the length of bore 94.

Referring now to FIGURES 1 and 5, it can be seen that passageway 62' extended also intersects the bone 78 which in turn intersects passageway 93. A one-way check valve 96 is disposed between passageway 93 and passageway 62'. Passageway 93 is coaxially aligned with exhaust bore 35. Block 40 is also bored at 97 which interconnects the passageway 64' to passageway 82. Interposed therebetween is a one-way relief valve 99.

The interrelationship, importance and operation of the above structure will be better understood when reference is made to the schematics of FIGURE 6 and FIGURE 6a.

In FIGURE 6, the numerals indicate like parts in the construction of FIGURES 1 through 5. In the schematic, there is shown a hydraulic system which includes a variable volume pump 100 having a stroke control mechanism shown diagrammatically at 102. For purposes of this description, it should be understood that an increase in pressure in chamber 104 of the stroke control will decrease fluid flow from pump 100. A pump of the type usable in this sytsem is described in assignee's copending application Ser. No. 599,227 filed Dec. 5, 1966. The pump 100 has an output conduit indicated by the numeral 106. Pressurized fluid in conduit 106 enters the motor housing via the intake 61 and passageway 62. In the position shown (FIGURES 3b and 6a), fluid from intake 61 traverses the porting plate 44 through slot 54 and to the barrel 13 through port 36 and arcuate slot 25. The expended fluid is exhausted from the barrel through the arcuate slot 26 and port 35.

At this point referral should be made to FIGURES 3a and 3b. FIGURE 3a discloses the position of porting plate 44 in neutral which corresponds to the schematic of FIGURE 6. When the handle 52 is so disposed, slot 54 is directly over passageway 62 and does not communicate the intake pressure to barrel 13 through bore 35. The slots 55 and 56 are respectively centered over the bores 43 and 41.

In neutral, the slot 58 spans the distance between passageways 72 and 73 and thus a limited amount of fluid is permitted to flow through the valve. In the schematic, of course, the valve plate is represented as being entirely in direction A, B or N. In actuality, the valve can be partially moved as shown in FIGURE 3b so that the essential metering or S-pressure is developed. In FIGURES 3b and 6a, the handle is shown moved to an intermediate position in a first direction. Here, the slot 54 partially communicates the fluid from passageway 62 to the barrel assembly via intake bore 35. Expended fluid from barrel 13 exhausts through bore 36. The exhausted fluid from 36 enters slot 55, travels through the S-chamber, through slot 55 to the exhaust port 64 at the metering area designated M. It can be seen that the size of metering area M is determined by the angular disposition of lever 52. For purposes of illustration let it be assumed that handle 52 is disposed as in FIGURE 3d and that for some reason the output shaft 16 is turning too fast. This of course will be reflected by additional flow through the motor and consequently area M will develop a back pressure which will be reflected instantly in the S-chamber 45. As seen best in the schematic and in FIGURE 4, the S-pressure is reflected back through port 41 and as a result to passageway 91. The excess fluid discharges to tank through restriction 112, check valve 99, and restriction 92 and line 120. However, a portion of this back pressure also is communicated to chamber 104 of the stroke control through the restricting orifice 122 and check valve 124 of line 94. The piston 102 is pushed inwardly and the pumpnig stroke is decreased. Conversely, if piston 102 moves outwardly, the pumping stroke is increased.

When the S-pressure drops, the opposite occurs. Namely, the spring of unit 102 will overcome the pressure in chamber 104 and the stroke of pump 100 increases.

In the neutral position of FIGURE 3a it can be seen that the slot 58 spans the passageways 72 and 73. The slot 73 is formed in plate 18 and leads to the interior of casing 12 which is substantially at tank pressure. The slot 72 on the other hand leads slot 58 to passageway 80. This permits a certain amount of coling fluid to circulate through the motor when the handle 52 is in neutral. Replenishing checks 126 and 128 are provided to prevent cavitation.

If handle 52 is rotated in the opposite direction it can be seen that the slot 54 will communicate port 62 with port 36 and the metering point will be at slot 56 and passageway 64. The S-pressure is still reflected through passageway 91 and all elements function in substantially the same manner as previously described.

It can also be seen that the extent of the restriction at the metering point in either direction is in direct relationship to the distance handle 52 is rotated from the neutral position.

In systems of this type brief rises and drops in system pressure can occur which are not truly indicative of system demands. In order that such brief inconsistences do not effect pump output, a delay element or anticipator 130 is provided. The delay element has a line 132 leading to the pump output 106 and a second line 134 leading to control line 94. A piston 133, connected to the end of unit 130 by a spring member 135, located within the chamber 131. The delay element acts as an anti-hunt or stabilizing unit. For instance, if the motor unit begins rotating too slowly, we have seen that the metering orifice pressure will cause the pump to increase its stroke. However, line 132 will immediately detect the increase in pressure, compressing spring 135, and thus fluid from chamber 131 will discharge into line 94 to temporarily delay a stroke change. In the event line 132 detects a drop in pressure the opposite occurs. Thus, if the signal was a spasmodic one, no stroke change will be made. The chamber 131, of course, has only a limited amount of fluid and only overcomes signals of short duration. If a rise or fall of pressure represents a true system demand, the required change will be made only after this short delay caused by element 130.

It can also be seen from FIGURES 4, 5 and the schematic of FIGURE 6 that the rearward extending passageway 62' leads to overload valves 84 and 96 respectively via passageways 82 and 93.

In the event overload valves must relieve the pressure in the motor unit, the excess fluid travels via line 83 to a pilot relief system. This normally takes place when disc 44 is in its neutral position. In this position, there is limited flow from intake 61 through port 72, slot 58, port 73 and then into housing 12. Much of the flow taken through intake 61 is diverted into 62' (since the intake ports are blocked) and from there through passageway 83 to valve 80. As previously mentioned valve 80 includes a plunger 86. Plunger 86 is biased toward its seat 89 via a spring 88. The plunger includes an orifice 87 which communicates passageway 83 to vent slot 72. Thus, when disc 44 is in neutral, the venting fluid travels through passageways 62', 83, orifice 87, vent 72, kidney slot 58, vent 73 to the tank pressure within the housing. At the same time principal flow is from passageway 83 through the valve seat 89 and to tank via 64'. When handle 52 is moved off neutral, channel 72 is blocked, and the spring 88 will bias valve 86 toward seat 87 to close the path to 64'.

In FIGURE 5 it is seen that vent 72 also leads to a relief valve 101. If a pressure build up occurs in 72 while disc 44 is in positions A or B, the valve 101 will unseat and open a path to 64'. This drop in pressure in 72 will also permit spring 88 to unseat valve 86.

There has been described a variable speed motor unit and system wherein the advantage of a non-tiltable swash plate is obtained and direction and speed are controlled via a single handle.

In a general manner, while there has been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

What is claimed is:

1. A fluid motor of a type having an inclined cam plate, a barrel having parallel cylinders formed therein in which are carried a plurality of pistons having their outer ends in engagement with the cam plate to thereby cause said pistons to travel through intake and discharge strokes as said barrel rotates, said motor being for use in combination with a variable fluid power source wherein the improvement is in the controls for delivery of fluid to and from said motor comprising a first plate having first and second arcuate openings in a first face thereof which sequentially communicate with said parallel cylinders as said cylinders traverse their intake and discharge strokes, said first and second arcuate openings respectively tapering to circular openings in the reverse face of said first plate, third and fourth openings in said reverse face communicated by an interior chamber through said plate, and first means for developing a pressure drop in said chamber and second means responsive to said pressure drop for varying said variable fluid power source.

2. The invention recited in claim 1 wherein said first means includes a disc having openings therein to adjustably communicate said circular openings with said third and fourth openings.

3. The invention recited in claim 2 wherein said disc abuts said reverse face and bearings rotatably mount said disc with respect to said plate.

4. The invention recited in claim 3 wherein a block is fixedly secured to said motor and said plate and receives the bearings in which said disc is rotatably mounted.

5. The invention recited in claim 4 wherein an operator handle is operably connected to said disc and the degree of communication between said circular openings and said third and fourth openings is controlled by said handle.

6. A hydrostatic transmission system having a pump, a control for varying the fluid output from said pump, a fluid motor, a conduit network communicating the output of said pump with the intake of said motor wherein the improvement comprises a line communicating said control with the fluid departing from said motor, first means creating a pressure drop proportionate to the extent of the departing fluid flow, and means sensing said pressure drop and reflecting same in said line, second means causing said control to increase pump output when said pressure drop decreases and decreasing said pump output when said pressure drop increases, and said first means includes a rotatable disc disposed across the output of said pump and said disc includes separate openings through which incoming fluid from said pump and fluid departing from said motor must traverse.

References Cited

UNITED STATES PATENTS 2,170,890 8/1939 Allen _____ 60—51 XR
2,238,061 4/1941 Kendrick.
3,139,038 6/1964 Stewart _____ 103—162

EDGAR W. GEOGHEGAN, Primary Examiner

U.S. Cl. X.R.

60—52; 103—162